Dec. 10, 1968  J. R. ARNOLD ET AL  3,415,286
TUBE-LIKE STRUCTURE AND PACKAGE MADE THEREFROM
Filed Aug. 25, 1964  4 Sheets-Sheet 3
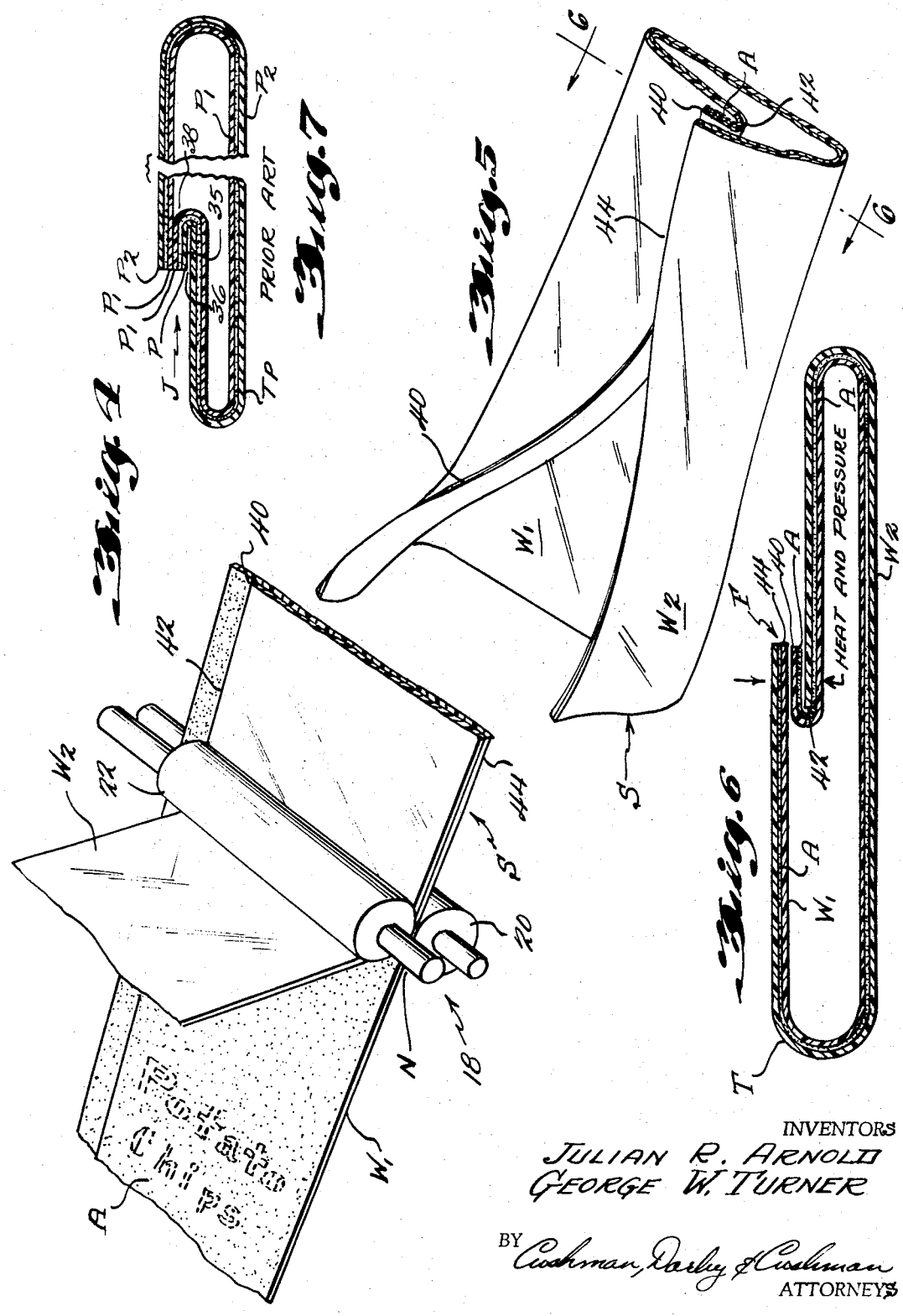
INVENTORS
JULIAN R. ARNOLD
GEORGE W. TURNER
BY Cushman, Darby & Cushman
ATTORNEYS

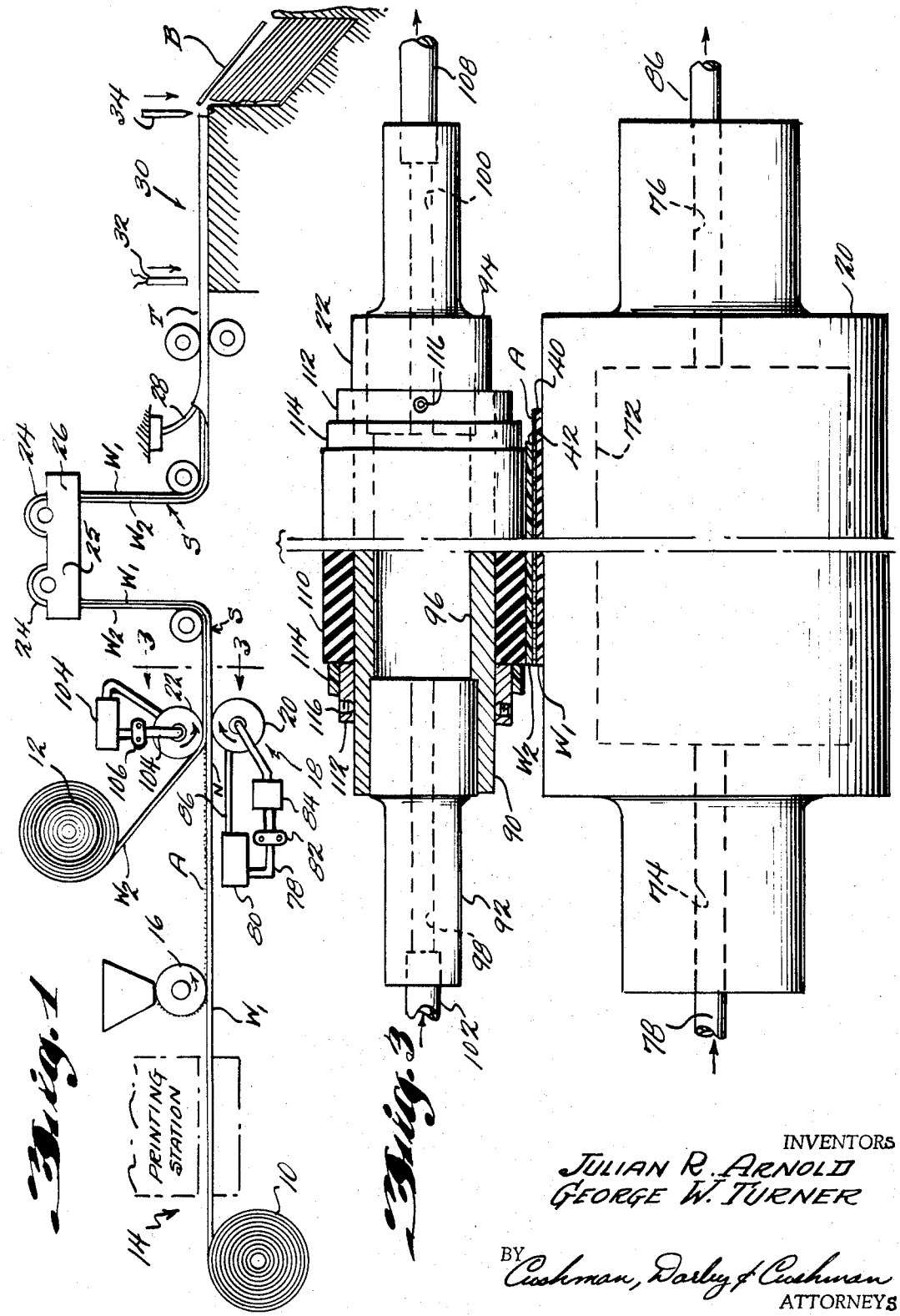

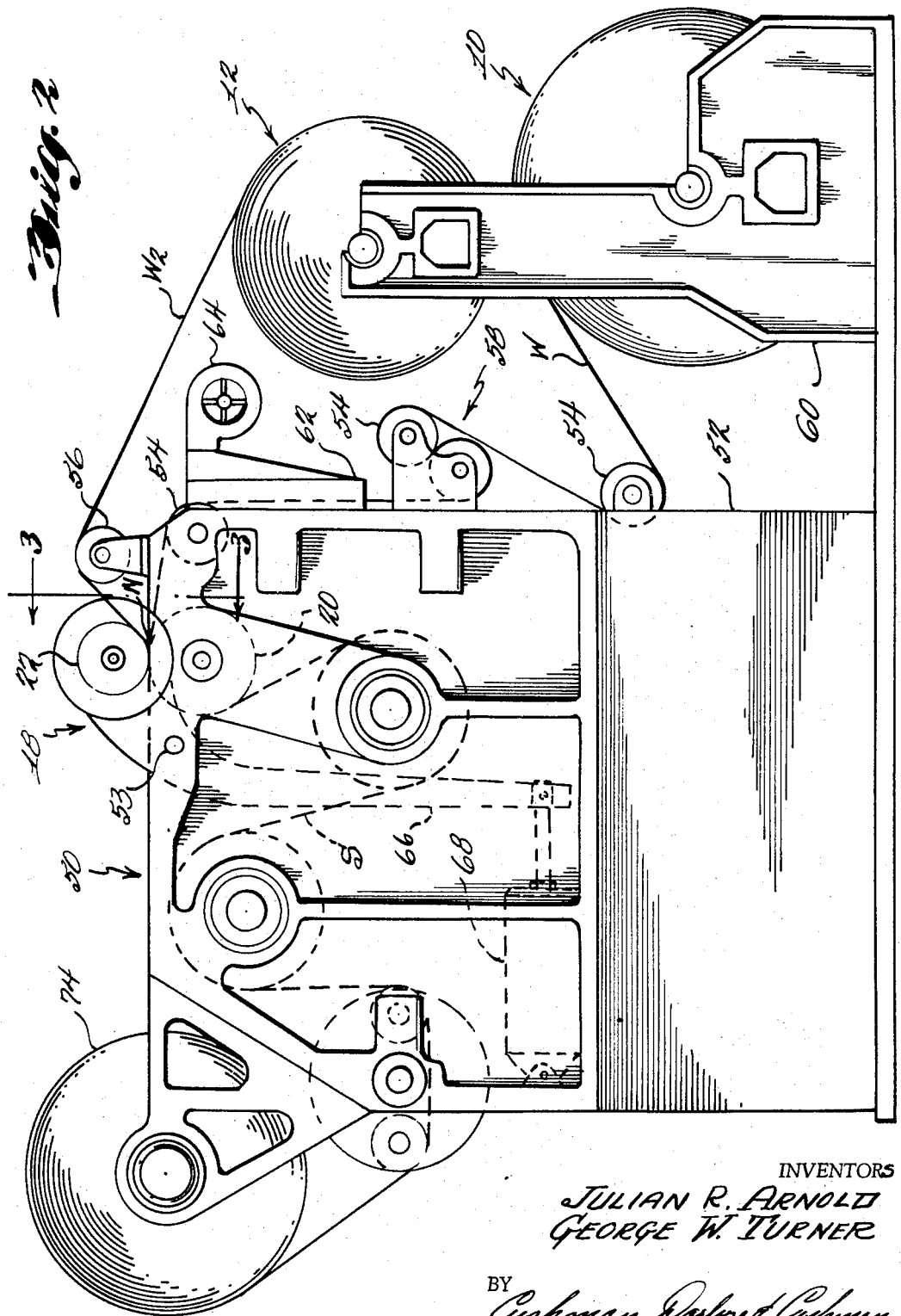

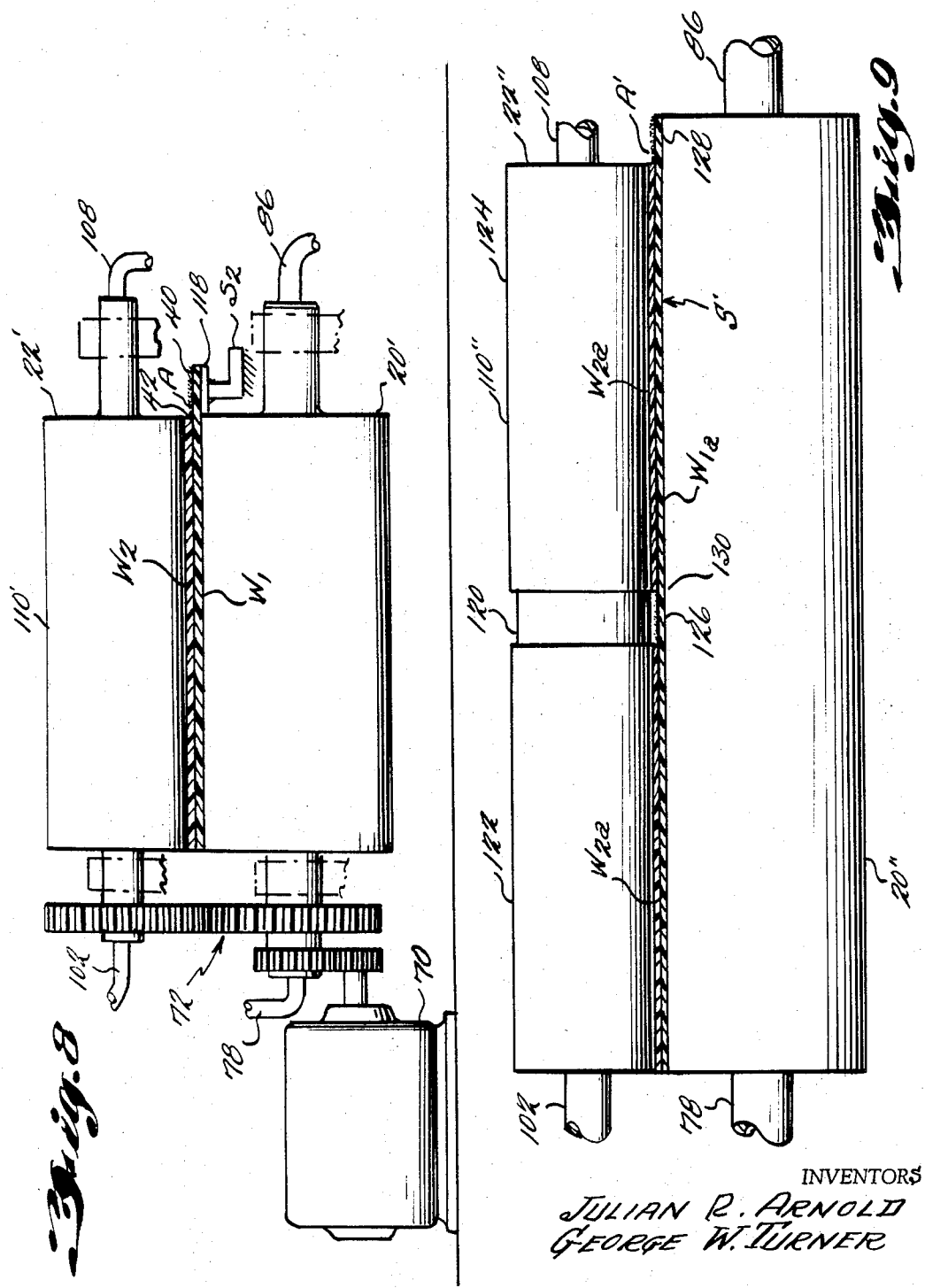

# United States Patent Office 3,415,286
Patented Dec. 10, 1968

3,415,286
TUBE-LIKE STRUCTURE AND PACKAGE MADE THEREFROM
Julian R. Arnold and George W. Turner, Miami, Fla., assignors to Arnold Cellophane Corporation, Miami, Fla., a corporation of Florida
Filed Aug. 25, 1964, Ser. No. 391,847
10 Claims. (Cl. 138—128)

ABSTRACT OF THE DISCLOSURE

A tube-like structure and a package manufactured therefrom, the tube-like structure being made from a flexible multi-ply film having an inner flexible ply and an outer flexible ply of dissimilar materials bonded to each other with the longitudinal edge portion of the inner ply extending beyond the longitudinal edge portion of the outer ply. The tube-like structure is provided with a fin-type seal extending longitudinally of the same, the fin-type seal being bonded to the outer longitudinal edge portion of the outer ply.

---

The present invention relates to the manufacture of packages such as bags, pouches or the like, and more particularly, to apparatus for and methods of manufacturing a multi-ply film tube from webs of dissimilar material the tube having a novel seal or joint longitudinally of the same and being adapted to be formed into packages.

In recent years with the advent of thermoplastic film sheets, the packaging industry has utilized the same in the development of packages for various products such as food products, tobacco, and the like. The thermoplastic webs have been formed into tubes and cut into bag size with one end of the tube being heat sealed and the other end being open for the insertion of the product to be packaged. After packaging the other end of the tube was subsequently heat sealed to close a package. A typical example of such prior packages is the potato chip bag which was originally made of cellophane from a tube-like structure. The longitudinal seal or joint of the tube-like structure was formed from heat sealing overlapping the edges of the web or sheet of cellophane and spaced transverse seals or joints were made. Subsequently, the tube was cut along the transverse joints.

More recently, it has been found desirable to use a laminated film of dissimilar materials in order to obtain the beneficial characteristics of each of the individual materials depending on the product being packaged. For example, bags have been made by bonding together sheets of polypropylene and cellophane for packages used in the packaging of food products such as potato chips, the cellophane being used as a carrier and the polypropylene being used for its strength, flexibility, and moisture resistance. Such a lamination of polypropylene and cellophane when used in a package gives a better "shelf life" to the product being packaged and also has better adaptability to temperature changes as the polypropylene is far more flexible and less resistant to cracking when the bag is subjected to cold or sudden temperature changes. Additionally, it is difficult to print on polypropylene alone without surface treating the polypropylene by an ozone flame treatment process or the like and, thus, the printing could be accomplished on the cellophane and then the polypropylene adhered to the printed surface of the cellophane, thus making a very attractive package with the printing protected by the outer ply of polypropylene.

In the manufacture of packages wherein a multi-ply sheet or film was used, difficulties were encountered in the making of the tube as a straight overlapping joint could not be made due to the fact that it was impossible to heat seal cellophane to polypropylene because of the different characteristics of heat sealing temperature of two materials. Polypropylene heat seals at approximately 300 to 350° F. whereas cellophane has a heat sealing temperature of approximately 220° F.

In order to obviate the aforementioned difficulty, a "French" or fin-type seal or joint was developed for making the longitudinal seal or joint of the tube. The "French" or fin-type seal is known in the industry as that type of seal wherein the multi-ply film is folded into tubular form with one longitudinal edge portion thereof being folded back on itself, the other longitudinal edge portion overlapping the folded back longitudinal edge so that the abutting surfaces at the joint were of the same material and, thus, could be heat sealed together. However, this type of seal still had disadvantages in that it was not secured to the body of the tubular structure and, thus, problems arose in filling the package due to the failure of the seal at its heat sealed junction when the fingers of the filling machine open the tubular package to insert the product being packaged. Also this type of "French" or fin-type seal, by not being secured down to the body of the tube, resulted in the finished package being difficult to convey to and package into cartons and display at the store as this seal was easily caught on the seal or edge of other packages and any protrusions. Additionally, such seals had an unsightly appearance in the finished package as it did not have as smooth an appearance as the straight overlapping seal used in the earlier types of packaging.

An important object of the present invention is to provide an improved apparatus for and method of manufacturing a tube for use in packaging, the tube having an improved novel "French" or fin-type seal which is secured to the body of the tube.

Another object of the present invention is to provide an improved method of laminating a multi-ply tube for use in packaging and the like from webs of dissimilar material, the tube having a "French" or fin-type seal secured to the body of the tube by a heat setting adhesive simultaneously with the heat sealing of the abutting surfaces of the longitudinal edge portions of the multi-ply film or sheet from which the tube is made.

Still another object is to provide an improved method of making a multi-ply film structure capable of being used in the manufacture of tubular bags having a fin-type seal bonded to the bag body.

A further object of the present invention is to provide an improved apparatus for laminating a continuous multi-ply film from at least two webs of dissimilar material, the apparatus having means to laminate the dissimilar webs of different widths without disturbing an adhesive coating previously applied at least to the surface of the longitudinal edge portion of the web of the wider width.

Ancillary to the immediately preceding object, it is a further object of the present invention to provide an apparatus with laminating rollers, one of the rollers having its peripheral surface made of metal or a rigid plastic and the other roller being provided with at least a rubber peripheral surface thereon, the apparatus having means to insure uniform pressure on the webs being laminated throughout the entire operation of a continuous run.

A further object of the present invention is to provide an improved apparatus for continuously laminating multi-ply film, the apparatus being capable of providing a uniform lamination with the use of pressure and a heat setting resin and, further, providing at least two exposed longitudinal areas on the film having adhesive thereon undisturbed, thus, permitting the multi-ply film to be cut longitudinally of the same so that two or more lengths of the multi-ply film are obtained for the manufacture of tubes to be used eventually for packages.

An object of the present invention is to provide an improved tube-like structure for use in subsequently manufacturing packages such as bags or the like, the tube-like structure being made from a multi-ply film having an inner ply of thermoplastic material and an outer ply of a dissimilar material bonded thereto and with a "French" or fin-type seal connecting the longitudinal edge portions of the film, the "French" or fin-type seal being secured to the body of the resulting tube.

Still another object of the present invention is to provide an improved tube-like structure made from a multi-ply film having an inner ply of a thermoplastic material with a heat sealing temperature less than the heat sealing temperature of an outer ply of thermoplastic material, the tube having a fin-type seal or joint along its longitudinal edge portion which has less layers of ply therein than previous types of "French" or fin-type seals.

These and other objects and advantages of the present invention will appear more fully in the following specification, appended claims, and drawings, in which:

FIGURE 1 is a schematic view illustrating diagrammatically the process and apparatus for making a multi-ply film tube having a "French" seal, the tube being subsequently severed transversely of the same into open end packages;

FIGURE 2 is a side elevational view of the novel apparatus for laminating two webs of dissimilar materials together, one web being wider than the other;

FIGURE 3 is an enlarged view taken on line 3—3 of FIGURE 1 or 2, the view being partly in section and disclosing only the novel laminating rollers of the apparatus of the present invention;

FIGURE 4 is a perspective view illustrating the lamination of two webs together as a multi-ply film in accordance with the present invention, the laminating rollers being shown schematically;

FIGURE 5 is a perspective view illustrating the formation of the "French" or fin-type seal or joint being made in a tube formed from the multi-ply film;

FIGURE 6 is an enlarged sectional view taken on the line 6—6 of FIGURE 5, the sections through the film being shown in exaggerated size for the purposes of clarity;

FIGURE 7 is a view similar to FIGURE 6 but illustrating a "French" or fin-type seal or joint made according to the prior art;

FIGURE 8 is a view similar to FIGURE 3 but showing a modified form of laminating rollers for making the improved multi-ply film used in manufacture of packages having the improved "French" or fin-type seal; and FIGURE 9 is another view similar to FIGURE 3 but showing a still further modification of laminating rollers used in making the multi-ply film of the present invention.

Referring now to the drawings wherein like character or reference numerals represent like or similar parts and in particular to FIGURE 1, there is disclosed a schematic representation of the continuous manufacture of multiply tubular, open ended packages from two webs of dissimilar material. It will be appreciated by those skilled in the art that while the schematic representation shows the complete process of manufacturing an open end bag as a continuous operation, this is not necessarily the case as usually the packager is supplied from the manufacturer of the laminated film with rolls of the laminated material and from these rolls, the packager first manufactures the tubes from which the bags are made on the conventional tube making machine and then manufactures the bags on the conventional bag making machinery.

In some instances, the packager merely makes the bags and the manufacturer makes the tubes while in other instances, the manufacturer of the laminated film completes the entire process and supplies the packager with the open ended bags. For purposes of description herein, the process has been shown in FIGURE 1 as a continuous process in order that an understanding of the problems existing and of the present invention will be fully appreciated.

In FIGURE 1, the numeral 10 represents a roll of a web $W_1$ of a thermoplastic material whereas the numeral 12 represents a roll of a web $W_2$ of a dissimilar material. As will be described in more detail later in the specification, the web $W_2$ on the roll 12 may be of a different thermoplastic material or it may be a non-thermoplastic material such as metal foil, paper, or the like. For the present purposes, it will suffice to say that the web $W_1$ on the roll 10 must be a thermoplastic material and of a necessarily wider width than the width of the web $W_2$ on the roll 12.

Assuming that the web $W_2$ on the roll 12 is transparent, a printing station 14 which may be a multi-color printing press is provided for printing the customer's name and product on the surface of the thermoplastic web $W_1$ of the roll 10 prior to its lamination with the web. If desired, and if necessary, the surface of the web $W_1$ may be previously treated with an ozone flame treatment process or some other process so as to make the printing thereon easier.

An adhesive applying station 16 follows the printing station 14 and at this station a heat setting adhesive, generally designated at A is applied to the entire surface of the web $W_1$. As will be explained in more detail, it is often desirous to provide two different adhesives on the surface of the web $W_1$ simultaneously at the adhesive applying station 16, one of the adhesives covering the major portion of the surface of the web $W_1$ which will be contiguous with the web $W_2$ and a second heat setting adhesive to the surface of the longitudinal edge portion of the web $W_1$ which will extend beyond the longitudinal edge of the web $W_2$. After the adhesive A has been applied to the surface of the web $W_1$, the web $W_1$, along with the web $W_2$, is fed to a laminating station generally designated at 18 between a pair of laminating rollers 20 and 22. The laminating station 18, which forms an important part of the apparatus of the present invention, includes the lower heated roller 20 and the upper pressure roller 22. A more detailed description of these rollers and of the apparatus will follow later in the specification.

After the web $W_1$ has been bonded to the web $W_2$ at the laminating station 18, with at least one longitudinal edge portion of the web $W_1$ extending beyond the corresponding and adjacent longitudinal edge of the web $W_2$, the multi-ply film or sheet S is wound on a roller 24 as indicated at 25 and the roller 24 is then reversed as shown at 26 so that the web $W_2$ is on the bottom when the multi-ply film S is fed to a conventional tube forming apparatus 28 for making a longitudinally extending "French" or fin-type seal or joint. While it has been illustrated that a roll 24 is made up of the multi-ply film S and then reversed in a carrier so that its ply $W_2$ will be on the bottom when the film is fed to the tube forming apparatus, it will be understood by those skilled in the art that this operation could take place at the packager's plant or the film S could be fed directly to the tube forming apparatus 28 by merely using the proper conveying rollers to progressively turn the film over.

The tube forming apparatus 28 merely includes the usual folding fingers which progressively folds the multi-ply film S into a tubular shaped structure and then folds the longitudinal edge portion of the web $W_1$ of the film S which extends beyond the longitudinal edge of the web $W_2$ back upon itself with the opposite longitudinal edge of the film S overlapping the same. The apparatus 28 also includes the usual heating element which applies heat and slight pressure to the progressively formed joint to cause heat sealing of the abutting surfaces of the inner ply at the joint. The heat and pressure applied will be sufficient to not only heat seal the abutting surfaces of the web $W_1$ but will also cause the adhesive on the folded back longitudinal edge portion to melt and fuse the same portion to the body of the formed multi-ply tube T. The tube T is then conveyed to a conventional bag forming apparatus 30 wherein a heating element 32 extending transversely of the tube makes spaced transverse heat seals and a knife 34 cuts the tube along the transverse seals into open ended bags B. The bags B are stacked for transfer to a conventional bag filling machine, not shown.

Referring now in detail to FIGURES 4 through 6, inclusive, there is disclosed the process of laminating the multi-ply film or sheet S and the subsequent forming of the tube with the longitudinally extending "French" or fin-type seal or joint. Before describing FIGURES 4 through 6, inclusive, it is best to describe the prior art type "French" or fin-type seal or joint arrangement as illustrated in FIGURE 7. In the prior art where it was desirous to use a multi-ply film, two sheets or webs of thermoplastic material of equal widths were bonded together. In FIGURE 7 there is shown a cross section of such a tube $T_p$ having an inner ply $P_1$ and an outer ply $P_2$. Since both plies were made of thermoplastic materials having different heat sealing temperatures, a conventional longitudinally extending overlapping joint or seal could not be made as the temperature for forming the heat seal could not be as high as the temperature of the ply having the highest thermosetting temperature, otherwise, the other ply would degrade or disintegrate. It will be appreciated that if an attempt were made to utilize an overlapping seal or joint in forming a tube from a multi-ply film where the plies are different thermoplastic material, the abutting surfaces for the overlapping seal or joint would be the plies of different material. Because of this, the "French" or fin-type seal was developed. As shown in FIGURE 7, the "French" seal or joint J of the prior art is made by folding one longitudinal edge portion 35 of the multi-ply sheet back upon itself so that its upper surface is the inner ply $P_1$ of the thermoplastic material having the lowest heat sealing temperature. This surface of the portion 34 abuts against the opposite overlapping longitudinal edge portion of the multi-ply sheet and, thus, is abutting against the inner ply $P_1$ of the same thermoplastic material. Heat and pressure is then applied and the two abutting surfaces of the ply $P_1$ are heat sealed together. However, since the heat sealing temperature cannot be increased in this environment to the temperature necessary to cause heat sealing of the outer ply $P_2$, the area 36 between the folded over portion 34 and the body of the tube $T_p$ was not sealed. When a bag made in accordance with the arrangement disclosed in FIGURE 7 was placed on a conventional bag filling machine and the usual spreading fingers of such a machine were inserted down into the open end of the bag spreading it apart, stresses at the point indicated at 38 oftentimes caused a separation of the heat sealed surfaces of the joint causing the bag to split at this joint and fall off the bag spreading fingers losing a certain amount of product. The weakness at the point 38 is caused by the fin or joint pulling away from the body of the bag.

The present invention obviates the aforementioned disadvantages encountered in the prior art by providing a "French" or fin-type seal F which is not only stronger than the prior art seal or joint J but is also less bulky in that there are less layers of plies in the same. Additionally the fin-type seal F gives the finished packages a much neater appearance and, thus, making it more appealing to the customers. As shown in FIGURE 4, the web $W_1$ which has heat setting adhesive A coated on its entire surface is fed along with the web $W_2$ to the laminating zone 18 between the rollers 20 and 22. It will be noted that the web $W_2$ has a width which is less than the overall width of the web $W_1$ so that when the two webs pass through the laminating rollers 20 and 22, a longitudinal edge portion 40 of the web $W_1$ extends beyond the longitudinal edge 42 of the web $W_2$. This longitudinal edge portion 40 has the adhesive A on its exposed surface facing the web $W_2$ and the adhesive thereon is undisturbed by the roller action of the pressure roller 22 when the heat is applied through the roller 20 to cause melting of the adhesive A and fusing of the two webs $W_1$ and $W_2$ together. A more detailed description of the particular arrangement of the rollers 20 and 22 for accomplishing the lamination without disturbance of the adhesive A on the longitudinal edge portion 40 will follow in the detailed discussion of the apparatus. After the two webs $W_1$ and $W_2$ are laminated as a multi-ply film S, the film S is immediately cooled so that the adhesive on the edge portion 40 solidifies as well as the adhesive between the contiguous surfaces of the film. The multi-ply film S is then reversed so that the web $W_1$ will become the inner ply and the web $W_2$ will become the outer ply when the tube is being formed.

Referring now to FIGURE 5, the multi-ply film S, which has been reversed, is folded into a tube-like structure with the longitudinal edge portion 40 being additionally folded back and over the longitudinal edge 42 of the outer ply or web $W_2$. When this is done, the adhesive A on the longitudinal edge portion 40 is facing the surface of the longitudinal edge portion of edge 42 of the outer ply $W_2$ whereas the opposite longitudinal edge 44 of the film S overlaps the outwardly facing surface of the longitudinal edge portion 40. It will now be appreciated that the inner surface of the longitudinal edge portion 44 is the inner ply or web $W_1$ and that it faces and abuts against the longitudinal edge portion 40 which is also of the same web $W_1$ and, thus, the abutting surfaces are of the same thermoplastic material.

By utilizing heat and pressure with the temperature of the heat sufficient to cause heat sealing of the web $W_1$, the abutting surfaces of the longitudinal edge portions 40 and 44 are heat sealed together. Also, by utilizing an adhesive which heat sets at well below the heat sealing temperature of the web $W_1$, the adhesive A on the underneath surface of the longitudinal edge portion 40 as viewed in FIGURE 6 will cause this portion of the web $W_1$ to seal to the surface of the longitudinal edge portion 42 of the web $W_2$. The joint or fin-type seal F of FIGURE 6 has one less ply therein than the joint or fin-type seal J of FIGURE 7 thus making a less bulky joint. Also, when applying the spreading fingers of the bag filling machine to the structure shown in FIGURE 6, the joint or fin-type seal F is stronger as the adhesive A holds the fin of the joint tight to the body of the tube structure T of the bag and, therefore, there are no undue stresses applied to the heat sealed area between the edge portion 40 and the edge portion 44. In other words, by bonding the fin of the joint to the body of the bag, the heat sealed area lies substantially in the plane of the wall of the bag and, thus, the stress on the heat sealed area is in shear rather than in tension when the fingers open the bag. It will further be noted that the bonded area of the fin to the bag will also be in shear and act cumulative with the heat seal joint to resist any tearing of the bag during filling. This construction has resulted in a considerable savings to the packager as there is little or no loss of product due to failure of the bag during filling.

In the above-described process of making the multi-ply film tube T, it will now be appreciated that when $W_2$ is of a thermoplastic material, it has a heat sealing temperature greater than the temperature of the web $W_1$ and that the adhesive used must have a heat setting temperature closely approximating the heat sealing temperature of the web $W_1$. Of course, where the web $W_2$ is metal foil or another material which is not thermoplastic, the thermoplastic material $W_1$ must have a heat sealing temperature which still will not in any way destroy or degrade the web $W_2$. Also, the adhesive A used as a substrate must be capable of melting at a temperature no greater than the heat sealing temperature of the web $W_1$ and it also must be compatible to bonding the material of the web $W_1$ to the web $W_2$.

An example of a tube T made according to the novel process described above and having the novel "French" or fin-type seal or joint longitudinally thereof is a tube having an outer ply made from a web $W_2$ of polypropylene and an inner ply made from a web $W_1$ of cellophane. The polypropylene has a heat sealing temperature of 300 to 350° F., whereas the cellophane has a heat sealing temperature in the order of 220° F. The adhesive A used for the substrate between the contiguous portions of the multi-ply film S was made by Interchemical Corporation of New York, N.Y. under the Code No. AB–5663, whereas the adhesive applied along the longitudinal edge portion 40 was made by Adcoat Chemical, Inc. of Elkgrove Village, Ill. having a Code No. 295–G. This adhesive was 75% vinyl polypropylene (Evas); 10% rewax 110–1B; 10% toluol; and 5% VMP naphtha. While a different adhesive was applied to the longitudinal edge portion 40 of the web $W_1$, both this adhesive and the adhesive on the major portion of the surface of the web $W_1$, had a melting point in the order of 150° F. and, therefore, a temperature below 205° F. was used to laminate the webs $W_1$ and $W_2$. A higher temperature than 205° F. is not used to laminate the webs $W_1$ and $W_2$ as it would affect the coating or printing on the cellophane. When making the joint or fin-type seal F, a temperature high enough to heat seal the abutting cellophane surfaces is used. Since this heat is applied locally to the joint, it does not affect the coating or printing on the cellophane.

Preferably, the bonding of the webs $W_1$ and $W_2$ is accomplished at a temperature in the order of 150° F. as during this portion of the process it is not necessary to raise the temperature to a point where cellophane heat seals. However, at the time the joint or fin-type seal F is made, the temperature utilized is in the order of 220° F., the heat sealing temperature for the cellophane. Usually, the temperature applied to the joint F is slightly higher than 220° F. as it must be transferred through the polypropylene. The loss of heat in transfer brings the temperature down to the heat sealing temperature of the cellophane at the abutting cellophane surfaces and even lower where the adhesive is melted. As mentioned above, two different adhesives were applied simultaneously to the surface of the web $W_1$, one adhesive may be applied to the entire surface, such as the adhesive 295–G. The only difference between the adhesive AB–5663 and 295–G is that the latter is thinner and requires less pressure to seal when making the joint or fin-type seal F.

Other heat setting adhesives which may be used for coating the surface of the web $W_1$ are adhesives based on a polybutadiene resin; a heat setting epoxy resin such as A bisphenol A-epichlorhydrin resin; a polyethylene glue consisting of 40% beeswax and 60% resin; or the like.

In addition to making multi-ply tubes T for the manufacture of packages from a web $W_1$ of cellophane and Web$_2$ of polypropylene, it has been found that the following combinations of plies have proved satisfactory for manufacturing tubes used in packages for various types of products:

| Package | Web W¹ | Web W² |
|---|---|---|
| 1 | Polyethylene | Polypropylene. |
| 2 | Polypropylene | Pliofilm. |
| 3 | do | Metal foil. |
| 4 | Polyethylene | Do. |
| 5 | Cellophane | Polyethylene. |

The above packages represent but a few of the various combinations of materials which may be used in making a multi-ply tube according to the process of the present invention to produce the novel fin-type seal or joint F. The adhesives heretofore referred to with respect to the package structure made from a ply of cellophane and a ply of polypropylene may also be used in manufacturing the above packages since in each instance the temperature for melting the heat setting adhesive of the substrate is less than the temperature for heat sealing the thermoplastic materials.

In each of the examples given above wherein two thermoplastic materials are laminated together, it will be noted that the thermoplastic material which forms the ply of the inside of the tube has the lower heat sealing temperature characteristic than the thermoplastic material which forms the outer ply. In the situation where a thermoplastic material is bonded to a non-thermoplastic material such as metal foil, then the temperature for heat sealing the thermoplastic material is not critical so long as it does not degrade or disintegrate the non-thermoplastic material. It should be mentioned at this time that the above-mentioned examples of packages made from dissimilar materials is given as an illustration of the application of the invention and is not to be construed as limiting the invention to these particular materials, it being within the scope of the inventon to cover the use of various dissimilar materials selected because of the compatibility of their characteristics for a particular product to be packaged.

Referring now to FIGURES 2, 3, 8, and 9, there is disclosed a novel apparatus for laminating the webs $W_1$ and $W_2$ together without disturbing the heat setting adhesive along the surface of the longitudinal edge portion 40 of the web $W_1$. In more detail, the laminator apparatus disclosed herein is generally indicated at 50 and includes a frame structure 52 in which is mounted the laminating station 18. The frame structure is provided with a plurality of vertically spaced rollers 54 at one end thereof which, together with the roller 56 constitutes a guiding means generally designated at 58 for guiding the webs $W_1$ and $W_2$ respectively to the laminating station 18. In FIGURE 1 the rollers 10 and 12 for the webs $W_1$ and $W_2$ respectively are disclosed feeding the webs $W_1$ and $W_2$ through a continuous operation involving the printing station 14 and adhesive applying station 16. However, it will be appreciated that the web $W_1$ can have the necessary material printed thereon and the adhesive applied thereto and then this web can be rolled upon a roller for transportation to an area where it is to be fed into a laminating apparatus 50. As shown in FIGURE 2, the frame structure 50 is provided for supporting the rolls 10 and 12, it being understood that the web on the roll 10 has already had the printing and adhesive applied thereon.

As the web $W_1$ is fed by the rollers 54 to the laminating zone 18 it is desirable to preheat the web $W_1$ so that the temperature of the same does not have to be elevated from room temperature to the heat setting temperature of the adhesive as the web $W_1$ passes through the nip N between the rollers 20 and 22. In order to preheat the web $W_1$, a tunnel 62 is provided on the inlet side of the apparatus, the tunnel being wide enough to receive the web $W_1$. A hot air blower 64 blows hot air through the tunnel against the adhesive coated surface of the web $W_1$ passing therethrough and elevates the temperature of the web $W_1$ as well as the adhesive A thereon.

The roller 20 at the laminating station or zone 18 is mounted for rotation in the frame structure 52 on a fixed horizontal axis whereas the roller 22 which is a pressure roller is suitably journaled in a pivotal frame structure 66, the frame structure 66 being pivoted to the main frame structure 52 at 53 and actuated by an air cylinder 68 between a laminating position as shown in FIGURE 2 and a position out of engagement with the roller 20 (not shown). The rollers 20 and 22 may be driven by a suitable motor 70 (FIGURE 8) through any desirable gear train 72. Also, a take-up roller 74 which is mounted in the frame structure 52 and upon which the multi-ply film S is wound may be suitably driven in a conventional manner off of the motor 70.

Roller 20, as shown by the broken lines indicated at 72 in FIGURE 3, has a hollow interior which communicates with a longitudinally and axially extending inlet passage 74 in one hub and a longitudinally and axially extending outlet passage 76 in its other hub. An inlet conduit 78 extending from a reservoir 80 (FIGURE 1) to the axially extending inlet passage 74 is provided with a pump 82 and a heating element 84 as shown in FIGURE 2 for pumping a hot liquid such as water to the hollow interior of the roller 20. An outlet or return conduit 86 extends from the axially extending outlet passage 76 back to the reservoir 80. As will now be appreciated, water is pumped from the reservoir 80 by the pump 82 through the heater 84 where it is heated to the desired temperature and from there flows into the hollow interior 72 of the roller 20 so as to heat the surface of this roller to a desired temperature. The roller 20, since it is heated, is preferably made from steel as it must in effect provide the anvil surface for the lamination of the multi-ply film or sheet S. Whereas a recirculating system is disclosed for flowing the heated water through the roller 20 and back to the reservoir 80, it will be appreciated that any suitable means may be utilized to heat the surface of the roller 20.

Roller 22 which is the pressure roller as it applies the necessary pressure to the contiguous portions of the webs $W_1$ and $W_2$, is similarly constructed to the roller 20 with respect to the interior thereof. As shown in FIGURE 3, roller 22 includes a steel sleeve 90 having hubs 92 and 94 inserted in the ends thereof to provide a hollow interior 96. The hubs 92 and 94 each have passages 98 and 100, respectively, therein the passages 98 and 100 extending axially of the hubs. A conduit 102 extending between the passage 98 and a reservoir 104 is provided with a pump 106 for pumping cold water from the reservoir into the hollow interior 96 of the roller 22. A conduit 108 extending from the passage 100 to the reservoir 104 returns the water pumped into the roller 22 back to the reservoir 104 where it is cooled.

As will be noted in FIGURE 3, the steel sleeve 90 of roller 22 is provided with a rubber sleeve 110 which engages the upper surface of the web $W_2$ and applies an even pressure to the webs as they are being bonded together. By cooling the roller 22, heat does not build up in the rubber sleeve 110 of this roller and, therefore, an even pressure is applied to the webs transversely across the same as the webs are being bonded together throughout the continuous operation or run of the apparatus. If the rubber is not cooled, it has been found that the surface of the same does not remain true throughout a run and, consequently uniform bonding of the webs is not maintained.

To further insure that the diameter of the rubber sleeve 110 remains constant throughout the operation regardless of the heat applied by the roller 20, and pressure exerted on the rubber sleeve 110 due to the mounting of the roller 22, the ends of the rubber sleeve 110 are provide with abutment means which prevent longitudinal or lengthwise extrusion of the rubber sleeve 110. In more detail, a collar 112 fixedly carrying thereon a Teflon abutment ring 114 is provided on each end of the steel sleeve 90 for the purpose of abutting the end of the rubber sleeve 110. The collar 112 is held in position by set screws 116, thus permitting the sleeve 110 to be changed when the same becomes worn or damaged. The Teflon abutment ring 114 has a diameter no greater than the maximum diameter of the rubber sleeve 110.

While the Teflon ring functions to prevent longitudinal extrusion of the rubber sleeve 110, it also functions to provide clearance between the adhesive on the surface of the longitudinal edge portion 40 of the web $W_1$. Since the rubber sleeve 110 cannot extrude longitudinally, its diameter is maintained constant, and thus the longitudinal edge portion 40 which passes beneath the Teflon ring 114 is spaced from the ring by a distance at least equal to the thickness of the web $W_2$. This is an important feature of the present apparatus as it permits the adhesive A on the longitudinally extending portion 40 to pass through the laminating zone 18 without touching the roller 22 which would remove the same from the edge portion 40. In FIGURE 3 the web $W_1$ is shown having only one longitudinal edge portion 40 extending beyond the corresponding longitudinal edge 42 of the web $W_2$. It will now be appreciated by those skilled in the art that the web $W_1$ could also extend on the left-hand side of the figure beyond the other longitudinal edge of the web $W_2$ beneath the left-hand Teflon ring 114 and then the multi-ply film or sheet S could be severed longitudinally down its middle so as to provide two rolls which could be each subsequently formed into tubes having the fin-type seal F of the present invention. Of course, the widths of the webs $W_1$ and $W_2$ would have to be controlled along with the size of the rollers 20 and 22 depending upon the size of the bag which is to be manufactured.

Referring now to FIGURE 8, a modified form of rollers 20' and 22' are shown. The rollers 20' and 22' are substantially identical in interior construction to the rollers 20 and 22 just previously described, the difference being in that the length of the rollers 20' and 22' which engage respectively the surfaces of the webs $W_1$ and $W_2$ are identical to the width of the smaller web $W_2$. In this arrangement, the longitudinal edge portion 40 of the web $W_1$ extending beyond the longitudinal edge 42 of the web $W_2$ must be supported when the pressure and heat are applied by the rollers 20' and 22'. In order to support the longitudinal edge portion 40', a flat shoe structure 118 fixedly supported to the frame structure 52 of the apparatus 50 and extending in a direction of travel of the webs, supports the longitudinal edge portion 40 so that the adhesive A thereon is not disturbed during the bonding process of the webs $W_1$ and $W_2$. By supporting the longitudinal edge portion 40 of web $W_1$ in this manner, the edge portion 40 is prevented from curling or folding downwardly. The roller 22' is provided with a rubber sleeve 110' but in this instance Teflon rings are not provided for abutting the ends of the same. While the rubber sleeve 110 might extrude slightly in a lengthwise direction, it is not sufficient to disturb the adhesive A on the longitudinal edge portion 40 of the web $W_1$, but the surface of the rubber sleeve 110 remains true as it is cooled so that heat does not build up in the same to cause uneven expansion axially of the same.

In FIGURE 9 a further modification of laminating rollers 20'' and 22'' is provided for laminating a multi-ply film which can be sliced longitudinally to make two separate rolls capable of forming into tubes for manufacture of bags in accordance with the present invention. The lower roller 20'' is substantially identical to the heated roller 20 whereas the upper roller 22'' is provided with a rubber sleeve 110'' having a circumferential groove 120 intermediate its ends. The groove 120 separates the rubber sleeve 110'' into a first section 122 and a second section 124, the overall length of the sections 122 and 124, plus the length of the groove 120 being less than the overall length of the roller 20''. In a laminating apparatus utilizing the rollers 20'' and 22'', a web $W_{1a}$ having its upper surface coated with a heat setting adhesive A' is fed therebetween, the web having a width substantially equal to the length of the roller 20''. Rather than feeding a single web $W_2$ between the roller 20'' and 22'', a pair of webs $W_{2a}$ are fed in side-by-side relationship, each of the webs $W_{2a}$ having a width equal to the length of the sections 122 and 124 and spaced apart a distance equal to the width of the groove 120. With the webs $W_{2a}$ being set in spaced relationship to each other a multi-ply film S' results having two portions 126 and 128 extending longitudinally thereof with exposed adhesive A' thereon. The resulting multi-ply film S' is sliced longitudinally at the point 130 to form two separate multi-ply films capable of being subsequently made into a tube structure of the present invention for the manufacture of bags or the like.

The process, product, and apparatus described above and claimed hereinafter fully and effectively accomplish the objects and advantages of the present invention. It will be realized, however, that the foregoing specific process, product, and apparatus have been illustrated and described only for the purpose of defining the principles of the present invention and such specific embodiments may be modified or changed to some extent without departing from such principles. Therefore, the terminology used throughout the specification and the illustrations disclosed in the drawings are for the purposes of describing and understanding the invention and are not for limitation, the spirit and scope of the invention being fully defined in the appended claims.

What is claimed is:

1. A tube-like structure for use in making bags or the like, said tube-like structure being made from a flexible multi-ply film having an inner ply of thermoplastic material and an outer ply of a dissimilar material bonded thereto with one longitudinal edge portion of the inner ply extending beyond a longitudinal edge of the outer ply and having a substrate of an adhesive on its surface facing toward the inner surface of the outer ply, a fin-type seal connecting the longitudinal edges of the multi-ply film, said fin-type seal being formed by the extending longitudinal edge portion of the inner ply being heat sealed with the opposite longitudinal edge portion of the inner ply and simultaneously bonded to the longitudinal edge portion of the outer ply beyond which it extends.

2. A tube-like structure as claimed in claim 1 in which said extending longitudinal edge portion of said inner ply is bonded to the longitudinal edge portion of the outer ply by a heat setting adhesive.

3. A tube-like structure as claimed in claim 2 in which said inner ply is cellophane and said outer ply is polypropylene.

4. A tube-like structure as claimed in claim 2 in which said inner ply is polyethylene and said outer play is polypropylene.

5. A tube-like structure as claimed in claim 2 in which said inner ply is polyethylene and said outer ply is metal foil.

6. A tube-like structure as claimed in claim 2 in which said inner ply is polypropylene and said outer ply is pliofilm.

7. A tube-like structure as claimed in claim 2 in which the lateral ends of said tube-like structure are heat sealed to form a package.

8. A tube-like structure for use in making bags or the like, said tube-like structure being made from a multi-ply film having an inner ply of thermoplastic material and an outer ply of a different thermoplastic material having a characteristic of a heat sealing temperature higher than the characteristic of the heat sealing temperature of the inner ply, said inner ply and outer ply being bonded together by a substrate of heat setting adhesive which sets at a temperature no greater than the heat sealing temperature of the inner ply, the inner ply having a longitudinal edge portion extending beyond a longitudinal edge of the outer ply and coated on its surface facing toward the outer ply with a substrate of heat setting resin which also has a characteristic of setting at a temperature no greater than the heat sealing temperature of the inner ply, a fin-type seal connecting the longitudinal edge portions of the multi-ply film, said fin-type seal being formed by the extending longitudinal edge portion of the inner ply being heat sealed with the opposite longitudinal edge portion of the inner ply and simultaneously bonded by the substrate on said extending longitudinal edge portion to the longitudinal edge portion of the outer ply beyond which it extends.

9. A tube-like structure for use in making bags or the like, said tube-like structure being made from a flexible multi-ply film having an inner ply and an outer ply of a dissimilar material bonded to each other with one longitudinal edge portion of the inner ply extending beyond a longitudinal edge of the outer ply, a fin-type seal connecting the longitudinal edges of the multi-ply film, said fin-type seal being formed by the extending longitudinal edge portion of the inner ply being sealed with opposite longitudinal edge portion of the inner ply and simultaneously bonded to the longitudinal edge portion of the outer ply beyond which it extends.

10. A tube-like structure as claimed in claim 9 in which said inner ply is coated with a heat setting adhesive for bonding the same to said outer ply, said further bonding of the longitudinal edge portion of the inner ply to the longitudinal edge portion of the outer ply beyond which it extends being accomplished by said heat setting resin.

References Cited

UNITED STATES PATENTS

| | | | |
|---|---|---|---|
| 1,928,118 | 9/1933 | Taylor | 138—152 X |
| 3,311,134 | 3/1967 | Howard | 138—152 X |

FOREIGN PATENTS 740,514   11/1955   Great Britain.

LAVERNE D. GEIGER, *Primary Examiner.*

E. EARLS, *Assistant Examiner.*

U.S. Cl. X.R.

138—137, 151; 229—48, 55